US009426416B2

(12) United States Patent
Eikenes et al.

(10) Patent No.: US 9,426,416 B2
(45) Date of Patent: Aug. 23, 2016

(54) SYSTEM AND METHOD FOR UTILIZING A SURFACE FOR REMOTE COLLABORATION

(71) Applicants: Anders Eikenes, Bekkestua (NO); Eamonn Shaw, Asker (NO); Eivind Danielsen, Sofiemyr (NO); Eva Min Viktoria Edlund, Oslo (NO); Einar Andreas Hustadnes Hagen, Oslo (NO); Kristian Magnus Østensen, Oslo (NO)

(72) Inventors: Anders Eikenes, Bekkestua (NO); Eamonn Shaw, Asker (NO); Eivind Danielsen, Sofiemyr (NO); Eva Min Viktoria Edlund, Oslo (NO); Einar Andreas Hustadnes Hagen, Oslo (NO); Kristian Magnus Østensen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 440 days.

(21) Appl. No.: 13/653,728

(22) Filed: Oct. 17, 2012

(65) Prior Publication Data

US 2014/0104431 A1    Apr. 17, 2014

(51) Int. Cl.
H04N 7/18 (2006.01)
H04N 7/14 (2006.01)
G06F 17/24 (2006.01)
H04L 29/06 (2006.01)

(52) U.S. Cl.
CPC ............ H04N 7/142 (2013.01); G06F 17/241 (2013.01); H04L 65/4015 (2013.01)

(58) Field of Classification Search
CPC .... H04N 7/15; H04N 7/181; H04N 13/0242; H04N 1/32106; H04N 2201/001; G06K 9/00463; G08B 13/19645

USPC .............................. 348/159, 42, 77; 358/474
See application file for complete search history.

(56) References Cited

U.S. PATENT DOCUMENTS

| 8,542,267 | B1 * | 9/2013 | Trott et al. ........................ 348/42 |
| 2006/0092178 | A1 * | 5/2006 | Tanguay et al. .............. 345/629 |
| 2008/0028325 | A1 * | 1/2008 | Ferren .................... H04N 7/142 715/753 |
| 2011/0211755 | A1 * | 9/2011 | Xu ..................... H04N 1/00681 382/165 |
| 2012/0062449 | A1 * | 3/2012 | Apostolopoulos et al. .... 345/76 |
| 2012/0284635 | A1 * | 11/2012 | Sitrick ................. G06Q 10/101 715/751 |
| 2012/0320158 | A1 * | 12/2012 | Junuzovic ............... G06F 3/017 348/46 |

FOREIGN PATENT DOCUMENTS

EP     1 883 238 A2    7/2007
WO    WO 2010054779 A1 *  5/2010

OTHER PUBLICATIONS

Hiroshi Ishii et al ("Iterative Design of Seamless Collaboration Media") Communication of the ACM; vol. 37; No. 3; pp. 83-97.*

(Continued)

Primary Examiner — Jamie Atala
Assistant Examiner — Masum Billah
(74) Attorney, Agent, or Firm — Baker Botts L.L.P.

(57) ABSTRACT

In one embodiment, a method includes receiving, by a processor, a first annotation corresponding to one or more markings made by a first user within a first collaboration region of a first surface. The first surface is remote from a second surface. The method also includes identifying, by the processor, a second collaboration region on the second surface. The second surface is proximate a camera. The method also includes displaying, by the processor, the first annotation in the second collaboration region. The method also includes creating, by the processor, a second annotation corresponding to one or more markings made by a second user within the second collaboration region on the second surface. The method also includes transmitting, by the processor, the second annotation.

19 Claims, 5 Drawing Sheets

(56) References Cited

OTHER PUBLICATIONS

Jason Palidwar, et al.; *Photonics Spectra; Multiband Optical Filters Find Applications Outside Fluorescence*; http://www.photonics.com/Article.aspx?AID=50539; 5 pages, Apr. 2012.

Hiroshi Ishii, et al;*Iterative Design of Seamless Collaboration Media*," Communications of the ACM: vol. 37: No. 3: pp 83-97, Aug. 1994.
PCT Notification of Transmittal of the International Search Report and the Written Opinion of the International Searching Authority, or the Declaration; International App. No. PCT/US2013/060269; 9 pages, date of mailing: Jan. 28, 2014.

* cited by examiner

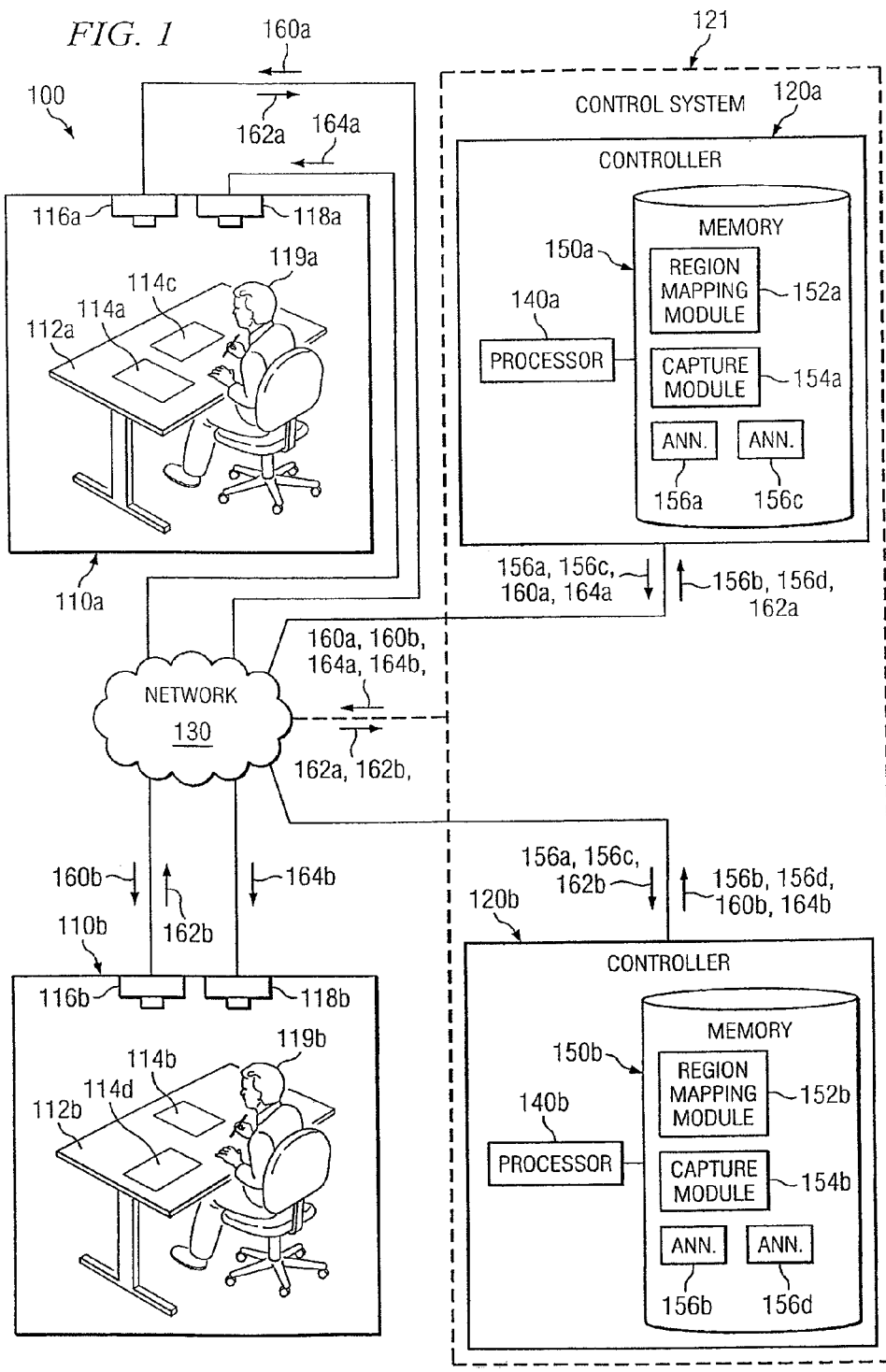

SYSTEM AND METHOD FOR UTILIZING A SURFACE FOR REMOTE COLLABORATION

TECHNICAL FIELD

This disclosure relates generally to the field of communications and, more particularly, to a system and method for utilizing a surface for remote collaboration.

BACKGROUND

A user may wish to share written information with others who, because of their location, cannot see the writing that the user is seeing or creating. Likewise, the user may wish to collaborate with the others on the writing that the user is seeing or creating. The others may be remote from the user, such as in a different room, or even in a different city or state.

BRIEF DESCRIPTION OF THE DRAWINGS

For a more complete understanding of the present disclosure, reference is now made to the following description, taken in conjunction with the accompanying drawings, in which:

FIG. 1 illustrates an example system for remote collaboration, in accordance with certain embodiments of the present disclosure;

DETAILED DESCRIPTION

Overview

Figure 2A:
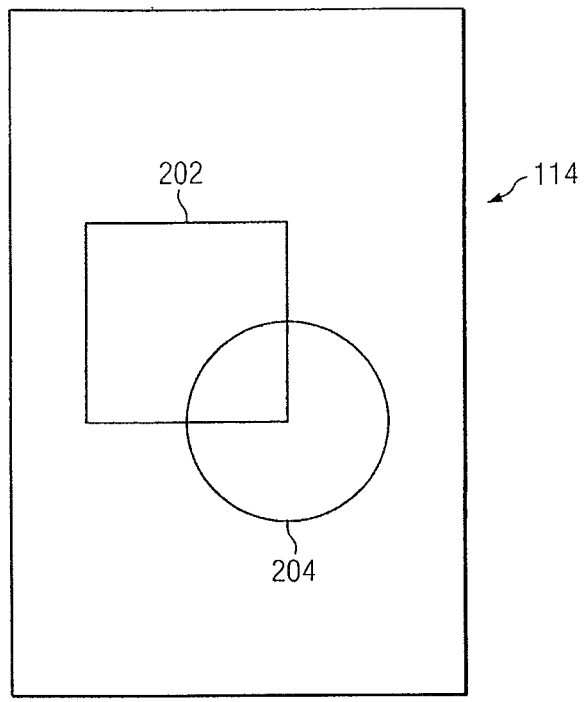
FIGS. 2A-2D illustrate an example collaboration region, in accordance with certain embodiments of the present disclosure.

In one embodiment, a method includes receiving, by a processor, a first annotation corresponding to one or more markings made by a first user within a first collaboration region of a first surface. The first surface is remote from a second surface. The method also includes identifying, by the processor, a second collaboration region on the second surface. The second surface is proximate a camera. The method also includes displaying, by the processor, the first annotation in the second collaboration region. The method also includes creating, by the processor, a second annotation corresponding to one or more markings made by a second user within the second collaboration region on the second surface. The method also includes transmitting, by the processor, the second annotation.

Description

FIG. 1 illustrates an example system 100 for remote collaboration, according to certain embodiments of the present disclosure. In general, system 100 may allow numerous users 119, some or all of whom may be in different or remote locations, to participate in remote collaboration. For example, system 100 may allow each user 119 to see what remote users 119 are seeing or drawing in the form of a projected image. System 100 may also allow the user 119 to mark on the projected image and allow the remote users 119 (e.g. user 119b) to see the markings made by the user 119 (e.g. user 119a). System 100 may then allow the remote users 119 to make further markings, and so on. In this way, system 100 may facilitate remote collaboration between users 119. In particular, system 100 may include one or more locations 110, one or more surfaces 112, one or more collaboration regions 114, one or more cameras 116, one or more projectors 118, one or more users 119, and a control system 121. Cameras 116, projectors 118, and control system 121 may be communicatively coupled by a network 130. In certain embodiments, control system 121 may include one or more controllers 120. Controllers 120 may also be communicatively coupled to network 130. In certain embodiments, controllers 120 may be physically remote from one another.

As one example, user 119a may mark or draw within collaboration region 114c of surface 112a. These markings may be captured by system 100 and projected onto collaboration region 114d of surface 112b, where they can be seen by user 119b. User 119b may make additional markings within collaboration region 114d of surface 112b. These additional markings may be captured by system 100 and projected onto collaboration region 114c of surface 112a, where they can be seen by user 119a. In a similar manner, additional markings made by either user 119 within their respective collaboration regions 114 will be displayed on the linked collaboration region 114 of the other user. Thus, system 100 may facilitate collaboration between users 119a and 119b.

Locations 110 may be any place from which one or more users 119 participate in remote collaboration. In the example of FIG. 1, user 119a is located at a first location 110a, while user 119b is located at a second location 110b, which is physically remote from the first location 110a. For example, locations 110a and 110b may be in different rooms in the same building. As another example, locations 110a and 110b may on opposite sides on a large room. As a further example, locations 110a and 110b may be in different cities, states, and/or countries. In certain other embodiments, multiple users 119 may be located in the first location 110a and/or the second location 110b. In further embodiments, one or more additional users 119 may be located at a third location 110. System 100 may include any suitable number of locations 110, and any suitable number of users 119 may be located at each location 110. Location 110 may include a conference room, an office, a home, or any other suitable location.

Each location 110 may include a surface 112. Surface 112 may be any area onto which projector 118 may project light and/or an image. In some embodiments, surface 112 may be a flat surface, such as a wall, a desk, a whiteboard, and/or a table. In other embodiments, surface 112 may be contoured (i.e. three-dimensional), rather than flat. As one example, a model of a person or animal could be used as a collaboration surface. Such a surface could be useful, for example, in medical applications. In certain embodiments, surface 112 may be, or include, a display device, such as a television, computer monitor, or electronic paper.

Each location 110 may also include a camera 116. Camera 116 may be operable to capture an image of all or a portion of surface 112. In some embodiments, camera 116 may be operable to capture a high resolution image, with a resolution of greater than 12 megapixels, for example. In some embodiments, camera 116 may capture an infrared image. Camera 116 may be equipped with a filter that allows infrared light to pass through to the image sensor but blocks light from the visible spectrum, and may be equipped with infrared LED (light emitting diode) modules and/or other infrared emitting sources to illuminate surface 112 at the wavelength(s) that may pass through the filter. Alternatively, camera 116 may be equipped with an infrared lens and/or may be an infrared camera. In other embodiments, camera 116 may capture a color image. In further embodiments, camera 116 may be operable to alternate between capturing an infrared image and capturing a color image. For example, camera 116 may have a retractable filter and/or separate lenses. As another example, camera 116 may have an internal prism which may separate incoming light so that both visible and infrared light could be captured simultaneously. In alternative embodiments, location 110 may have multiple cameras 116, some of which are operable to capture infrared images, and some of which are operable to capture color images. In certain embodiments, camera 116 may be operable to capture a three-dimensional image of surface 112.

In certain embodiments, camera 116 may be operable to image all or substantially all of surface 112. In other embodiments, multiple cameras 116 may be used to provide imaging coverage of the entire surface 112. As one example, four cameras 116 may be used, with each camera 116 capturing a different quadrant of surface 112. The quadrants may be overlapping or non-overlapping, according to particular needs. This disclosure contemplates any suitable number of cameras 116 at a given location 110.

In certain embodiments, camera 116 may be operable to pan, tilt, and/or zoom when capturing an image. Camera 116 may perform these operations in order to dynamically adjust to a surface 112 that is non-static and/or non-stationary. For example, these operations may be performed in response to signals received from controller 120, which may track changes and/or movement in surface 112.

Each location 110 may also include a projector 118. Projector 118 may be operable to project light and/or an image onto all or a portion of surface 112. In some embodiments, projector 118 may remove infrared light from the spectrum of the light being projected onto surface 112. For example, the lens of projector 118 may be fitted with a filter that blocks light within the infrared spectrum.

In certain embodiments, projector 118 may be operable to project onto all or substantially all of surface 112. In other embodiments, multiple projectors 118 may be used to provide projection coverage of the entire surface 112. As one example, four projectors 118 may be used, with each projector 118 projecting onto a different quadrant of surface 112. The quadrants may be overlapping or non-overlapping, according to particular needs. This disclosure contemplates any suitable number of projectors 118 at a given location 110.

A surface 112 may have one or more collaboration regions 114. A collaboration region 114 may be a portion of surface 112 on which collaborative markings may be captured and/or displayed. In some embodiments, a piece of paper may serve as a collaboration region 114. In other embodiments, collaboration regions 114 may be built into surface 112. A collaboration region 114 may be rectangular, square, or any other suitable shape, including a free-form shape. A user 119 may interact with collaboration region 114 by making one or more markings in or on collaboration region 114.

In certain embodiments, network 130 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, control system 121 may refer to any suitable combination of hardware and/or software implemented in one or more modules to process data and provide the described functions and operations. In some embodiments, the functions and operations described herein may be performed by multiple control systems 121. In some embodiments, control system 121 may include, for example, a mainframe, server, host computer, workstation, web server, file server, a personal computer such as a laptop, or any other suitable device operable to process data. In some embodiments, control system 121 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, control system 121 may be a web server running Microsoft's Internet Information Server™.

In general, control system 121 communicates with cameras 116a-b and projectors 118a-b to facilitate collaboration between users 119a-b. In certain embodiments, control system 121 may include multiple controllers 120. In the example of FIG. 1, controller 120a communicates with camera 116a, projector 118a, and controller 120b (via network 130) to facilitate collaboration between users 119a-b. Likewise, in the example of FIG. 1, controller 120b communicates with camera 116b, projector 118b, and controller 120a (via network 130) to facilitate collaboration between users 119a-b. In some embodiments, each location 110 may have an associated controller 120. In other embodiments, control system 121 may include only a single controller 120 for all locations 110. This disclosure contemplates any suitable number of controllers 120, according to particular needs.

In some embodiments, controller 120 may refer to any suitable combination of hardware and/or software implemented in one or more modules to process data and provide the described functions and operations. In some embodiments, the functions and operations described herein may be performed by multiple controllers 120. In some embodiments, controller 120 may include, for example, a mainframe, server, host computer, workstation, web server, file server, a personal computer such as a laptop, or any other suitable device operable to process data. In some embodiments, controller 120 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, controller 120 may be a web server running Microsoft's Internet Information Server™.

Controller 120 may include a processor 140 and memory 150 in some embodiments. Memory 150 may refer to any suitable device capable of storing and facilitating retrieval of data and/or instructions. Examples of memory 150 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other volatile or non-volatile computer-readable memory devices that store one or more files, lists, tables, or other arrangements of information. Although FIG.

1 illustrates memory 150 as internal to controller 120, it should be understood that memory 150 may be internal or external to controller 120, depending on particular implementations. Also, memory 150 may be separate from or integral to other memory devices to achieve any suitable arrangement of memory devices for use in system 100.

Memory 150 is generally operable to store region mapping module 152, capture module 154, and annotations 156. Region mapping module 152 may provide the functionality to allow controller 120 to identify and track collaboration regions 114 on surface 112. Region mapping module 152 generally refers to logic, rules, algorithms, code, tables, and/or other suitable instructions for performing the described functions and operations. Capture module 154 may provide the functionality to allow controller 120 to create one or more annotations 156 corresponding to one or more markings on one or more collaboration regions 114 of surface 112. Capture module 154 generally refers to logic, rules, algorithms, code, tables, and/or other suitable instructions for performing the described functions and operations. Annotations 154 may be any suitable data that records one or more markings made by a user 119 on one or more collaboration regions 114 of surface 112.

Memory 150 is communicatively coupled to processor 140. Processor 140 is generally operable to execute logic stored in memory 150 (including region mapping module 152 and capture module 154) to facilitate collaboration between users 119 according to the disclosure. Processor 140 may include one or more microprocessors, controllers, or any other suitable computing devices or resources. Processor 140 may work, either alone or with components of system 100, to provide a portion or all of the functionality of system 100 described herein. In some embodiments, processor 140 may include, for example, any type of central processing unit (CPU).

In operation, the stored logic (including region mapping module 152 and capture module 154), when executed by processor 140, facilitates collaboration between users 119.

Region mapping module 152 may be operable when executed by processor 140 to identify and track one or more collaboration regions 114 on surface 112. For example, region mapping module 152 may detect that a user 119 has placed a piece of paper on surface 112. Region mapping module 152 may do this by communicating one or more camera control signals 160 to camera 116 and receiving in response one or more image signals 162. Region mapping module 152 may process the image signals 162 to locate edges in the image signals 162 using edge detection algorithms, such as a Canny edge detector. Region mapping module 152 may then search for closed paths or contours among the identified edges. If region mapping module 152 identifies a closed path that has not previously been designated as a collaboration region 114, region mapping module 152 may designate the shape corresponding to the closed path as a collaboration region 114 on surface 112. In some embodiments, the colors and/or patterns of surface 112 may be chosen to create a high contrast with a piece of paper or other object placed on surface 112.

Region mapping module 152 may request the approval of user 119 before designating a new collaboration region 114 in some embodiments. For example, region mapping module 152 may project virtual buttons next to the proposed new collaboration region 114, allowing user 119 to accept or reject the new collaboration region 114 by touching one of the projected buttons.

Region mapping module 152 may request that user 119 place a piece of paper on surface 112, so that a new collaboration region 114 may be created in some embodiments. For example, if controller 120a receives a notification that a new collaboration region 114b has been created on surface 112a and receives annotations 156 associated with that region from controller 120, controller 120a may need a collaboration region 114 on surface 112a that may be linked with the new collaboration region 114b and where the received annotations 156 may be projected. Once user 119a places a new piece of paper on surface 112a, region mapping module 152 may detect this and create a collaboration region 114a on surface 112a. Region mapping module 152 may link collaboration region 114a with collaboration region 114b and control projector 118a to project the received annotations 156 associated with collaboration region 114b onto collaboration region 114a (e.g. via projector control signal 164).

Region mapping module 152 may be operable to track any movements of the shape that corresponds to a collaboration region 114. For example, if a piece of paper has been selected as a collaboration region 114, region mapping module 152 may detect movements of the paper, and update the collaboration region 114 based on the new position and/or rotation of the piece of paper. Region mapping module may detect such movements using the collaboration region detection techniques described above. If these detections are performed repeatedly, such that only a small amount of time elapses between detections, any given collaboration region 114 will likely not move very far. Thus, a "new" collaboration region 114 detected near a location where a known collaboration region 114 was in the last detection cycle may be determined to be a movement of that region, especially if the regions are somewhat overlapping and/or the known region is no longer detected in its last known location. Additionally or alternatively, region mapping module 152 may detect movement and/or rotation of a known collaboration region 114 based on the content within the collaboration region 114 (e.g. the markings on a piece of paper.) For example, region mapping module 152 may correlate the changes between content in two successive detection cycles and use features of the content as landmarks to determine whether and to what extent a particular collaboration region 114 has moved and/or rotated.

Region mapping module may thus preserve the relationship between the physical region (e.g. the paper) and the image(s) being projected onto and/or captured from that region. In other words, as the paper is rotated or moved, the image(s) projected onto it will rotate or move along with the paper. On the other hand, as the paper is rotated or moved, the image(s) being captured from it will not change, as they will still be defined relative to the position and orientation of the collaboration region 114. Examples of this functionality will be described in greater detail in connection with FIGS. 3A-3B.

Capture module 154 may be operable when executed by processor 140 to create one or more annotations 156 corresponding to one or more markings on one or more collaboration regions 114 of surface 112. Once a collaboration region 114 has been identified and created (e.g. region 114a), capture module 154 may capture markings made by a user 119 (e.g. user 119a) within the collaboration region 114 in real-time and create annotations 156 corresponding to the captured markings. These annotations 156 may be transmitted to a second control 120 for projection onto a linked collaboration region 114 (e.g. region 114b) for display to another user (e.g. user 119b). Capture module 154 may accomplish this by sending one or more camera control signals 160 to and receiving one or more image signals 162 from camera 116. In an embodiment where multiple cameras 116 provide coverage of surface 112, capture module 154 selects the appropriate camera or cameras 116 based on the location of each collaboration region 114 and the respective coverage areas of each camera 116.

Capture module 154 may be operable to capture only physical markings within a collaboration region 114, rather than images and/or light being projected onto collaboration region 114 (i.e. from one or more projectors 118). As one example, capture module 154 may utilize camera 116 to capture an infrared image of surface 112. Because such an image will capture only trace amounts of light from the visible spectrum, it may not contain images projected onto surface 112 by projector 118. As a result, the image may be captured even when projector 118 is projecting images onto surface 112. The resulting image may be black and white. Capture module 154 may process the infrared image using the known coordinates or locations of collaboration regions 114 on surface 112 to identify one or more markings within each collaboration region 114. In some embodiments, capture module 154 may create an annotation 156 corresponding to the markings made in each collaboration region 114. Alternatively, capture module 154 may create multiple annotations 156 for each collaboration region 114, or may create only a single annotation 156 for multiple collaboration regions 114. In some embodiments, capture module 154 may vectorize the infrared image. For example, capture module 154 may represent the image using various points, lines, curves, shapes, and/or polygons.

In other embodiments, rather than filtering out infrared light at the projector 116 and capturing an infrared image using camera 118, capture module 154 may select any wavelength or group of wavelengths to distinguish content drawn on surface 112 from content projected onto surface 112. In other words, camera 118 could capture an image comprising any light of any wavelengths not projected by projector 116. For example, projector 116 may use three narrowband light emitting diodes (LEDs) to project an RGB image (e.g. at 460 nm., 545 nm., and 617 nm.). Camera 118 and/or capture module 154 may use a notch-filter to remove light at these wavelengths from the captured image. This may allow camera 118 to capture a color image of markings on surface 112 while avoiding capturing projected light on surface 112, even while projector 116 is projecting onto surface 112.

As a second example, capture module 154 may utilize camera 116 to capture an image generated by camera 116 while projector 118 is not projecting light onto surface 112. For example, capture module 154 may send one or more projector control signals 164 to projector 118 to cause projector 118 to briefly project no image or only white light, while simultaneously sending one or more camera control signals 160 to camera 116 to cause camera 116 to capture an image during this time. Because no image is being projected onto surface 112 during this time, camera 116 may capture all visible light, which may result in a color image of the physical markings on surface 112. If the time period when projector 118 is not projecting is relatively brief, it may be imperceptible or virtually imperceptible to a user 119. Capture module 154 may process the captured image using the known coordinates or locations of collaboration regions 114 on surface 112 to identify one or more markings within each collaboration region 114. In some embodiments, capture module 154 may create an annotation 156 corresponding to the markings made in each collaboration region 114. Alternatively, capture module 154 may create multiple annotations 156 for each collaboration region 114, or may create only a single annotation 156 for multiple collaboration regions 114. In some embodiments, capture module 154 may vectorize the infrared image. For example, capture module 154 may represent the image using various points, lines, curves, shapes, and/or polygons.

In some embodiments, system 100 may be able to reduce the duration of the time period when projector 118 is not projecting by using synchronization algorithms. For example, camera 116 may use a global shutter sensor (e.g. CCD or CMOS sensor) such that all pixels record light simultaneously. The timing of the global shutter sensor may be synchronized with LED lighting used by camera 116 to illuminate surface 112 and/or collaboration regions 114. In certain embodiments, the short duration and synchronization may allow higher instantaneous power to be provided by the LEDs, which may allow for a sensor integration time on the order of 0.1 ms. In such a case, it may not be necessary to control the projector 118 to stop projecting onto surface 112 while the image is captured.

As a third example, capture module 154 may use both of the above techniques interchangeably. For example, capture module 154 may use the second example technique to capture a high-resolution, color image at set intervals, and between these intervals, may capture numerous infrared images using the first example technique. As another example, capture module 154 may determine which technique to use based on a determination of whether a user 119 is writing on surface 112 and/or in a collaboration area 114 at the time an image is to be captured. For example, capture module 154 may capture a color image during a time when a user 119 is not writing or marking on surface 112 and/or in a collaboration area 114, but during a time when a user 119 is writing or marking may capture an infrared image. In an embodiment where multiple cameras 116 and/or projectors 118 are used, capture module may nearly simultaneously capture an infrared image of one portion of surface 112 and a color image of another portion of surface 112, based on the activity occurring within collaboration regions 114 within the respective portions.

Examples of the functionality of capture module 154 will be described in greater detail in connection with FIGS. 3A-3B.

Once one or more annotations 156 have been created by capture module 154, controller 120 may transmit the created annotations to one or more controllers 120. In the example of FIG. 1, controller 120a may have captured markings in collaboration region 114a on surface 112a as annotation 156a. Controller 120a may then transmit annotation 156a to controller 120b. Controller 120b may identify the collaboration region 114 on surface 112b that is linked (or that will be linked) with collaboration region 114a on surface 112a, such as collaboration region 114b. Controller 120b may then project the markings from user 119a onto collaboration region 114b (via projector 118b) for viewing by user 119b. If user 119b makes markings in collaboration region 114b, capture module 154b may create an annotation 156b that captures these markings. Controller 120b may transmit annotation 156b to controller 120a so that controller 120a may project the markings from user 119b onto collaboration region 114a (via projector 118a). This process may continue in a similar manner, with additional and/or updated annotations being created so that markings made by either user 119 within a collaboration region 114 will be captured and projected onto the linked collaboration region 114 of the other user 119. This process may be performed simultaneously for any suitable number of collaboration regions 114 on each surface 112. Similarly, this process may be scaled to accommodate any number of locations 110, surfaces 112, users 119, and/or controllers 120. In other words, if there are three users 119 using three different surfaces 112, three controllers 120 may exchange annotations 156 so that markings made by each of the three users 119 within a collaboration region 114 will be captured and projected onto the linked collaboration regions 114 of the other two users 119.

In certain embodiments, controller 120 may be operable to produce a printed copy of the markings made in one or more of the collaboration regions 114 on one or more surfaces 112 (e.g. via a printer communicatively coupled to network 130.) For example, upon receiving a request from a user 119, controller 120 may control the printer to print any desired annotations 156.

In an embodiment where multiple projectors 118 provide coverage of surface 112, controller 120 may select the appropriate projector or projectors 116 to use based on the location of each collaboration region 114 and the respective coverage areas of each projector 116.

In some embodiments, controller 120 may be operable to correct for distorting effects, such as those introduced by the camera and/or the projector. For example, controller 120 may apply keystone correction algorithms to reduce the effects of a non-normal projection angle between projector 116 and surface 112 and/or a non-normal angle between camera 118 and surface 112. As another example, controller 120 may correct for distortion caused by the lens and/or optics of projector 116 and/or camera 118.

In some embodiments, a non-normal angle between camera 118 and surface 112 may be desirable, as it may reduce the likelihood that the hand or pen of user 119 will block the line of sight of camera 118, which would tend to obscure the markings on surface 112 and/or the tip of a pen being used by user 119. In further embodiments, multiple cameras 118 at different non-normal angles may be used to further reduce this likelihood.

In certain embodiments, at one ore more locations 110, the projector 116 may not be present, and the surface 112 may include a display device, on which collaboration regions 114 may be created and/or identified. As one example, surface 112 may be a light emitting diode (LED) display that transmits only visible light through a glass or plastic window. User 119 could mark on collaboration regions 114 created on the window. Rather than project annotations 156 onto the collaboration regions 114, controller 120 may control the display device to display the annotations 156. Controller 120 may capture the markings made by user 119 using any of techniques described above, or any other suitable technique. As another example, surface 112 may be electronic paper that can display content using e-ink. The e-ink may be colored e-ink which would not be visible in an infrared image. User 119 could mark on collaboration regions 114 created on the electronic paper. Rather than project annotations 156 onto the collaboration regions 114, controller 120 may dynamically write annotations 156 onto the electronic paper. Controller 120 may capture the markings made by user 119 using any of techniques described above, or any other suitable technique.

In some embodiments, controller 120 may allow users 119 to use an electronic document as a starting point for collaboration. For example, controller 120 could recognize a document designated as a collaboration region 114 as being a printed copy of an electronic document (e.g. stored in memory 150 or elsewhere in system 100). Controller 120 may identify the electronic document based on comparison with the image of collaboration region 114 (the printed document) captured by camera 116. The electronic document may be of higher resolution and/or quality than the image captured of the document captured by camera 116. Controller 120 may use the electronic document rather than the captured image as the starting point for collaboration, and proceed to capture and transmit only subsequent annotations 156 (markings made on the printed document by user 119).

Figure 2B:
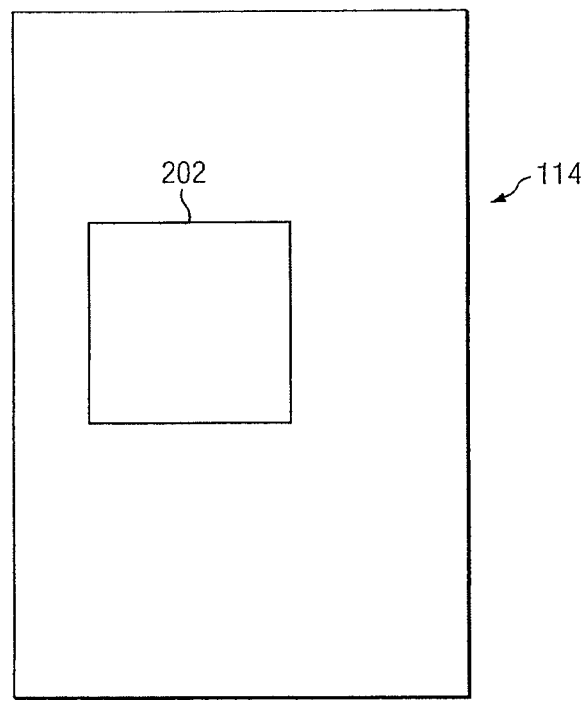

FIGS. 2A-2D illustrate an example collaboration region 114, in accordance with certain embodiments of the present disclosure. FIG. 2A may represent a collaboration region 114 at a time when a projector is projecting an image onto the region 114 and a user has made markings in the region 114. Markings 202 may be projected markings that were made by a remote user in a collaboration region linked to collaboration region 114. Markings 204 may be physical markings made by a local user. If an ordinary camera is used to capture an image of region 114, it may undesirably capture both markings 202 and markings 204. If markings 202 (created by the remote user) were captured as being markings of the local user and transmitted to the remote user, they would be projected onto the physical markings 202 in the linked region 114, which may create a feedback loop and/or an undesirable image echo effect. FIG. 2B may represent the linked collaboration region 114 where markings 202 were made by the remote user.

Figure 2C:
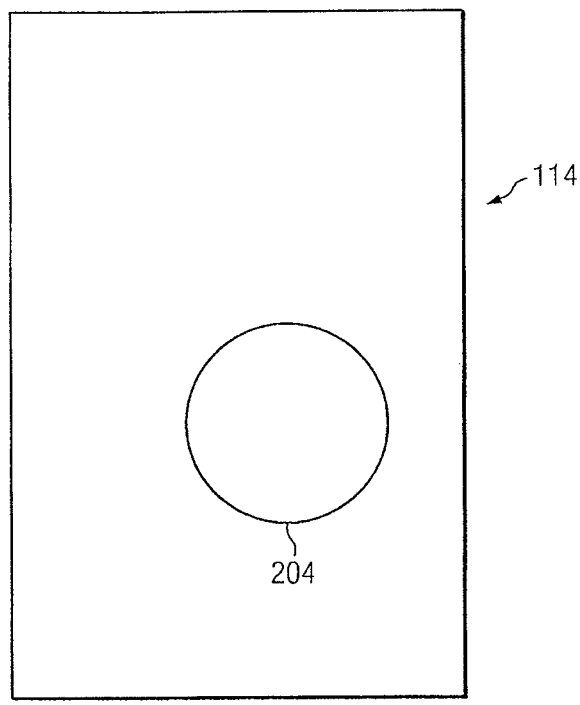

Therefore, controller 120 may be operable to create an annotation 156 that captures markings 204, but does not captures markings 202. FIG. 2C may represent collaboration region 114 at a time when a projector is not projecting an image onto the region 114. Alternatively, FIG. 2C may illustrate an infrared image of collaboration region 114, which would not capture markings 202 projected by a projector. Thus, if an image of collaboration region 114 were captured either at a time when markings 202 were not being projected or at any time as an infrared image, only physical markings 204 would be captured. Because an infrared image may be of lower resolution than an image captured when a projector is not projecting, and may be in black and white rather than in color, in some embodiments, it may be desirable to alternate between these two techniques of capturing markings 204. For example, high-resolution color images can be captured at intervals and/or at times when a local user is not marking in region 114, and numerous infrared images can be captured between these intervals. In some embodiments, at the remote side, the most recent intermediate infrared image may be projected on top of the most recent interval color image to provide updates between high-resolution images. In some embodiments, the interval color image may serve as a reference image, and the intermediate infrared images may be processed to capture only changes since the last captured image.

Figure 2D:
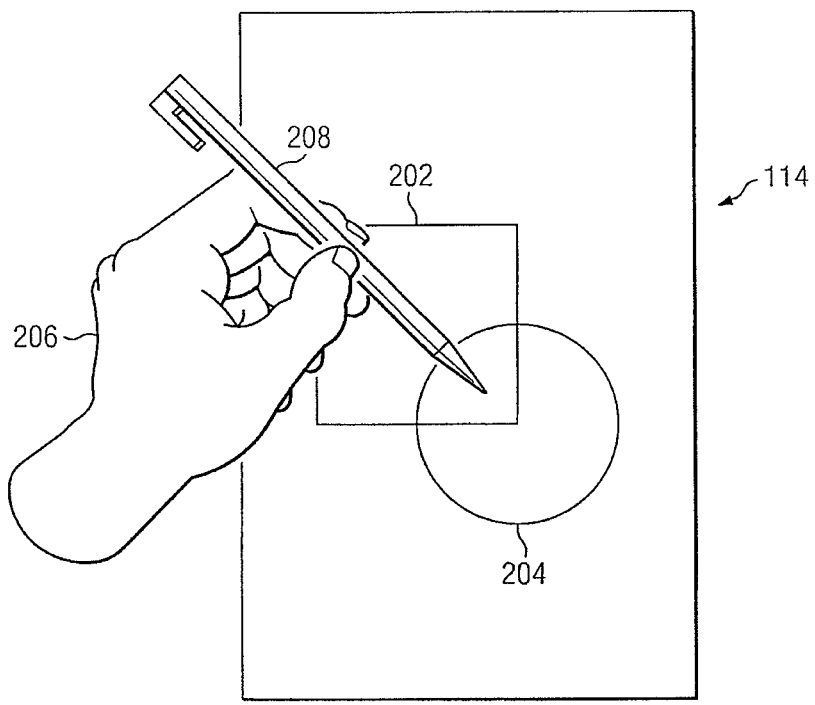

FIG. 2D may represent a collaboration region 114 at a time when a user is marking, writing, and/or obscuring a portion of collaboration region 114. In certain embodiments, controller 120 may be able to recognize the tip of pen 208 and designate the area around the tip as a high-frequency update region during times when a user is marking and/or writing within collaboration region 114. In certain embodiments, intermediate infrared images may only be generated for a portion of region 114, in order to decrease the amount of data that must read from the camera, for example. For instance, controller 120 may only generate, receive, and/or process those portions of the infrared image that are currently designated as high-frequency update regions.

In the example of FIG. 2D, hand 206 and pen 208 are obscuring a portion of markings 202 and 204 from the perspective of a camera that would capture an image of region 114. It may be desirable to avoid capturing hand 206 and pen 208 when creating annotation 156. Controller 120 may accomplish this, for example, by capturing images of region 114 only at times when it detects that a user is not marking, writing, and/or obscuring a portion of collaboration region 114. However, this may prevent a user at a remote site from seeing what a user is writing or drawing until the drawing is complete. Thus, in some embodiments, high-resolution color images may be captured at times when a user is not writing, marking, and/or obscuring collaboration region 114, with infrared images being captured at times when a user is writing, marking, and/or obscuring region 114.

In certain embodiments, controller 120 may distinguish markings 202-204 from hand 206 and/or pen 208. For example, controller 120 may identify skin tones in the image or may detect changes and/or movement in the captured image. As another example, controller 120 may distinguish markings 202-204 from hand 206 and/or pen 208 by capturing a three-dimensional image of collaboration region 114. The three-dimensional image may indicate depth values, which represent a distance from the camera. The three-dimensional image may be processed along with an infrared image of the collaboration region 114. Portions of the three-dimensional image that are closer than a determined distance threshold may be considered to be above surface 112, while portions that are farther away than the determined distance threshold may be considered to be on surface 112. The portions of the three-dimensional image may correspond to portions of the infrared image. Thus, portions of the three-dimensional image above surface 112 may correspond to portions of the infrared image that are obscured by hand 206 and/or pen 208. Controller 112 may apply a transparency mask to these portions of the infrared image to reduce the intensity of these portions, which are unlikely to convey information about the content a user has drawn within region 114. The transparency mask may also be used to provide partial transparency, in certain embodiments (e.g. displaying a stored high-resolution image with a real-time "shadow hand" in the foreground). On the other hand, portions of the three-dimensional image on surface 112 may correspond to portions of the infrared image that correspond to the content that should be captured in an annotation 156. This technique may be used in combination with the other techniques described above to allow remote users to see what a user is writing or drawing, even while the user is still writing, with minimal disturbance to the image during the time when the user's hand and/or pen obscure the content.

Figure 3A:
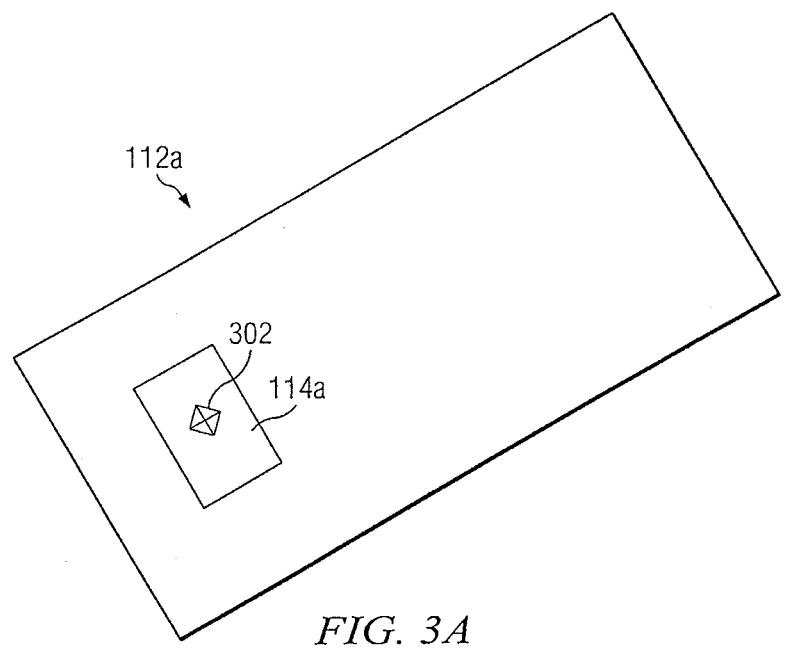
FIGS. 3A-3B illustrate an example surface for collaboration, in accordance with certain embodiments of the present disclosure.
Figure 3B:
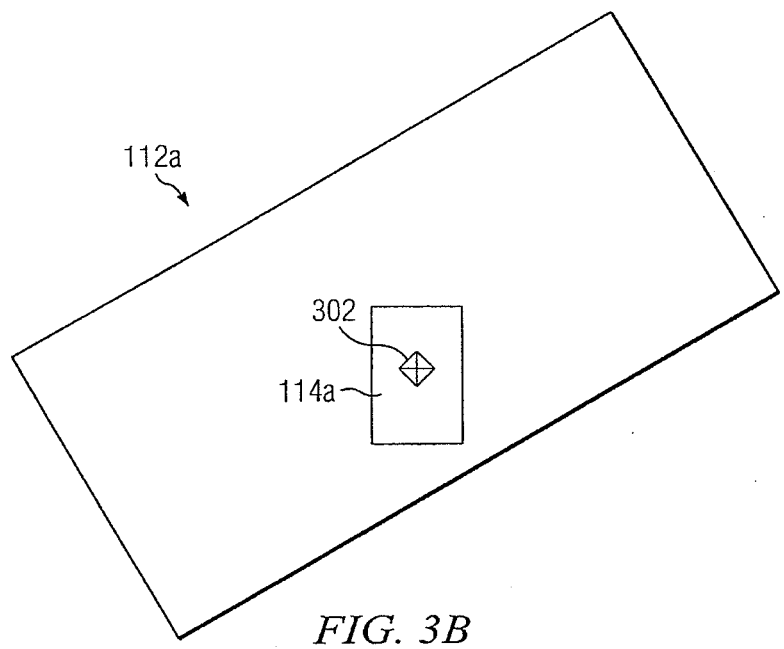

FIGS. 3A-3B illustrate an example surface 112a for collaboration, in accordance with certain embodiments of the present disclosure. In the example of FIGS. 3A-3B, a piece of paper on surface 112a has been designated as collaboration region 114a, which includes markings 302.

First, suppose markings 302 are physical markings made by a user local to surface 112a. Controller 120 may create an annotation 156 corresponding to markings 302 and transmit it to other controllers 120. If the local user moves the piece of paper from its location in FIG. 3A, to its location in FIG. 3B, which involves both a translation and a rotation, but does not make any additional markings on the paper, the new annotation 156 created by controller 120 should be substantially identical. Controller 120 will be able to detect the movement of the paper, as described above in connection with FIG. 1. Controller 120 will then update the location of the collaboration region 114a that corresponds to the paper to reflect this movement. Because annotation 156 may be defined relative to the underlying collaboration region 114a, as long as no new markings are made within the region 114a, annotation 156 should be invariant to a movement or rotation of the underlying region 114a. As a practical matter, this means that the local user's movement of the paper will have no effect on the image being projected onto a linked collaboration region on a remote surface. The remote user may not even be aware that the local user has moved the piece of paper.

On the other hand, suppose markings 302 are projected markings which correspond to markings made by a remote user on a linked collaboration region 114. If the local user moves the piece of paper from its location in FIG. 3A, to its location in FIG. 3B, which involves both a translation and a rotation, then controller 120 may alter the projected image so that it appears to follow the movement and rotation of the paper. Controller 120 will then update the location of the collaboration region 114a that corresponds to the paper to reflect this movement. Because annotation 156 may be defined relative to the underlying collaboration region 114a, the projection of annotation 156 onto collaboration region 156 follow movements and rotations of the underlying region 114a. In other words, if the region 114a rotates, the projected image should rotate similarly and if the region 114a moves, the projected image should move along with it. Thus, the projected markings may maintain their relationship to the region 114a, just as if they were physically printed on a page. As before, the remote user's linked region 114 will be unaffected by the local user's movements of collaboration region 114a.

Although the example of FIGS. 3A-3B illustrates only a single collaboration region 114a, controller 120 may apply these same principles to track movement and rotation of any suitable number of collaboration regions 114 on any given surface 112.

Figure 4:
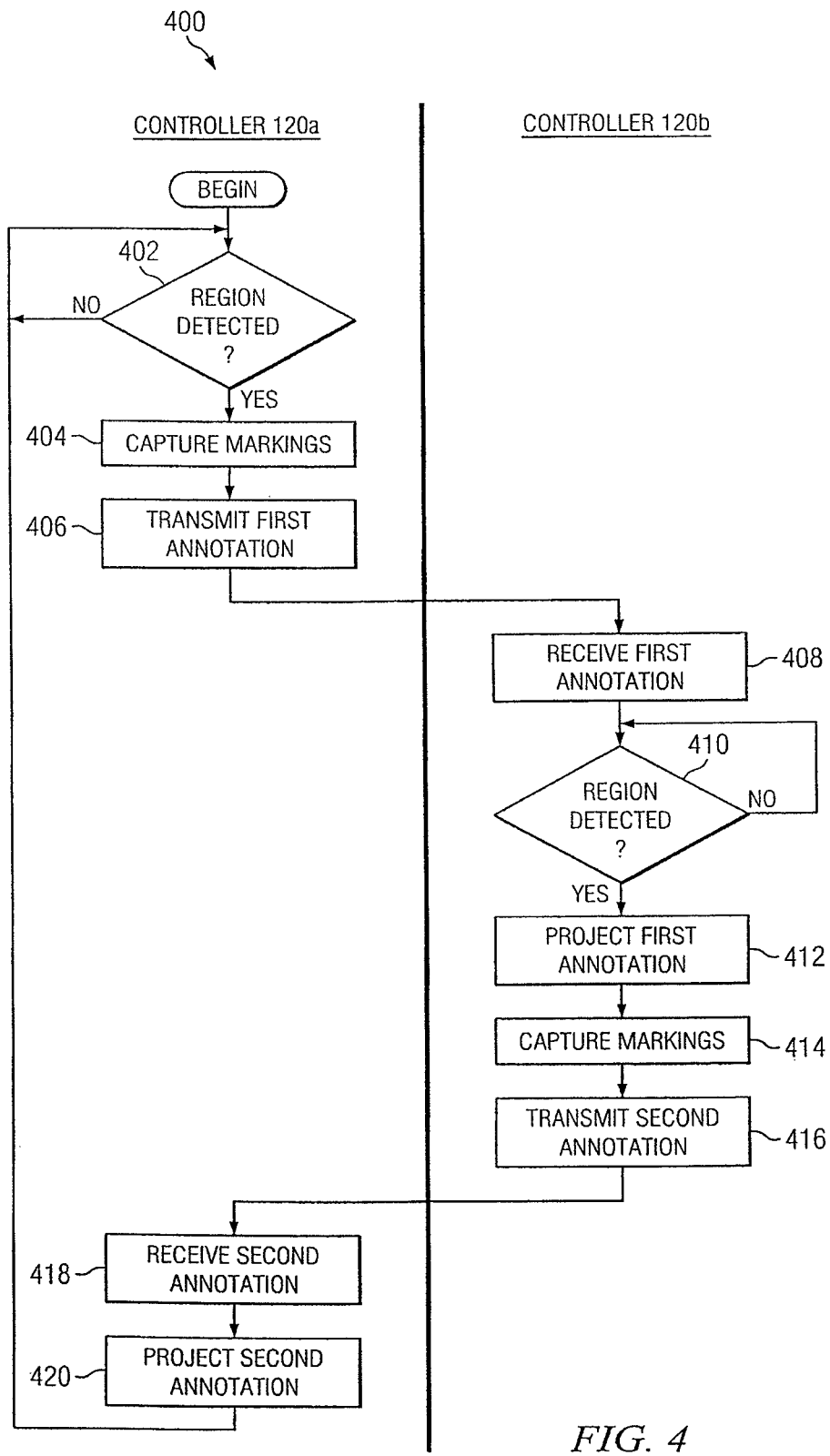
FIG. 4 illustrates an example method for remote collaboration, in accordance with certain embodiments of the present disclosure.

FIG. 4 illustrates an example method 400 for remote collaboration, in accordance with certain embodiments of the present disclosure. The method begins at step 402, where controller 120a detects whether a new collaboration region 114 should be designated on surface 112a. For example, controller 120a may detect whether a user has placed a piece of paper on surface 112a. If so, the method proceeds to step 404. If not, the method may continue to wait at step 402 until a piece of paper is detected. In some embodiments, if a collaboration region has already been designated, controller 120a may detect any movement or rotation of the paper that corresponds to the collaboration region 114a and update the collaboration region 114a accordingly before proceeding to step 404. This may be done using any of the techniques described in connection with FIGS. 1 and 3A-3B.

At step 404, controller 120a may create a first annotation 156a corresponding to one or more markings made by a first user within collaboration region 114a using the techniques described in connection with FIGS. 1 and 2A-2D.

At step 406, controller 120a may transmit the first annotation 156a to controller 120b. At step 408, controller 120b may receive the first annotation 156a.

At step 410, controller 120b detects whether a new collaboration region 114 should be designated on surface 112b to be linked with the collaboration region 114 on surface 112a (which corresponds to the received first annotation 156a). For example, controller 120b may detect whether a user has placed a piece of paper on surface 112b. If so, the method proceeds to step 412. If not, the method may continue to wait at step 410 until a piece of paper is detected. Controller 120b may prompt the user to place a piece of paper on surface 112b so that a collaboration region 114 may be created to display the markings corresponding to annotation 156a. In some embodiments, if a collaboration region has already been designated and linked, controller 120b may detect any movement or rotation of the paper that corresponds to the collaboration region 114b and update the collaboration region 114b accordingly before proceeding to step 412. This may be done using any of the techniques described in connection with FIGS. 1 and 3A-3B.

At step 412, controller 120b may project the markings described in first annotation 156a onto the linked collaboration region 114. At step 414, controller 120b may create a second annotation 156b corresponding to any markings a second user makes within collaboration region 114a. This may be done using the techniques described in connection with FIGS. 1 and 2A-2D to avoid capturing the projected markings of the first user when creating the second annotation 156b.

At step 416, controller 120b may transmit the second annotation 156b to controller 120a. At step 418, controller 120a may receive the second annotation 156b. At step 420, controller 120a projects the marking described by the second annotation 156b onto the collaboration region 114 on surface 112a. At this point, the first and second user should be looking at substantially the same image in their respective linked collaboration regions 114. Each should be able to see his or her own markings, as well as the projected markings of the other user.

The method may end after step 420. Alternatively, the method may return to step 402 and repeat as many times as desired, allowing for the designation of any suitable number of collaboration regions 114 on each surface 112, as well as the creation of any suitable number of annotations 156 within each collaboration region 114.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time and/or asynchronously, where appropriate. For instance, some of the steps performed by controller 120a may occur substantially simultaneously with other steps being performed by controller 120b, even though depicted as occurring sequentially in FIG. 4. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present invention has been described in several embodiments, myriad changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
   a first camera operable to image at least a portion of a first surface;
   a first projector operable to project onto the first surface;
   a second camera operable to image at least a portion of a second surface, the second surface remote from the first surface;
   a second projector operable to project onto the second surface;
   a control system communicatively coupled to the first camera, the first projector, the second camera, and the second projector, the control system operable to:
   identify a first collaboration region on the first surface at least in part by detecting an edge within the image of the at least a portion of the first surface using at least one edge detection technique, the first surface proximate the first camera and the first projector, wherein the first collaboration region occupies less than the entirety of the first surface;
   create a first annotation corresponding to one or more markings made by a first user within the first collaboration region;
   identify a second collaboration region on the second surface, the second surface proximate the second camera and the second projector, wherein the second collaboration region occupies less than the entirety of the second surface;
   control the second projector to project the first annotation onto the second collaboration region;
   create a second annotation corresponding to one or more markings made by a second user within the second collaboration region on the second surface;
   control the first projector to project the second annotation onto the first collaboration region; and
   wherein identification of a first collaboration region further includes:
   searching for a closed path including the detected edge; and
   in response to determining that the closed path has not been previously designated as a collaboration region, designating a shape corresponding to the closed path as the first collaboration region.

2. The system of claim 1, wherein creating the second annotation comprises identifying the one or more markings made by the second user by processing an image of the second collaboration region, the image generated by the second camera while the second projector is not projecting the first annotation onto the second collaboration region.

3. The system of claim 1, wherein creating the first annotation comprises:
   detecting a movement of the first collaboration region;
   updating the first collaboration region based on the movement; and
   identifying the one or more markings made by the first user within the updated first collaboration region.

4. The system of claim 1, further comprising a third camera operable to image at least a portion of the second surface, and wherein creating the second annotation comprises identifying the one or more markings made by the second user, the identification comprising:
   processing an infrared image of the second collaboration region, the infrared image generated by the second camera while the second projector is projecting the first annotation onto the second collaboration region; and
   processing a color image of the second collaboration region, the color image generated by the third camera while the second projector is not projecting the first annotation onto the second collaboration region.

5. The system of claim 1, wherein the control system is further operable to:
    identify a third collaboration region on the first surface; and
    create a third annotation corresponding to one or more markings made by the first user within the third collaboration region.

6. The system of claim 1, further comprising:
    a third camera operable to image at least a portion of a third surface, the third surface remote from the first surface and from the second surface;
    a third projector operable to project onto the third surface; and
    wherein the control system is communicatively coupled to the third camera and the third projector, and is further operable to:
    identify a third collaboration region on the third surface, the third surface proximate the third camera and the third projector;
    control the third projector to project the first annotation and the second annotation onto the third collaboration region; and
    create a third annotation corresponding to one or more markings made by a third user within the third collaboration region.

7. The system of claim 1, wherein the control system comprises a first controller and a second controller.

8. A system, comprising:
    a camera operable to image at least a portion of a first surface;
    a projector operable to project onto the first surface; and
    a controller communicatively coupled to the camera and the projector and operable to:
    receive a first annotation corresponding to one or more markings made by a first user within a first collaboration region of a second surface, the second surface remote from the first surface;
    identify a second collaboration region on the first surface at least in part by detecting an edge within the image of the at least a portion of the first surface using at least one edge detection technique, the first surface proximate the camera and the projector, wherein the second collaboration region occupies less than the entirety of the first surface;
    control the projector to project the first annotation onto the second collaboration region;
    create a second annotation corresponding to one or more markings made by a second user within the second collaboration region on the first surface;
    transmit the second annotation; and
    wherein identification of a second collaboration region further includes:
        searching for a closed path including the detected edge; and
        in response to determining that the closed path has not been previously designated as a collaboration region, designating a shape corresponding to the closed path as the second collaboration region.

9. The system of claim 8, wherein creating the second annotation comprises:
    determining whether the second user is marking within the second collaboration region; and
    identifying the one or more markings made by the second user by processing an image of the second collaboration region, the image generated by the camera while the second user is not marking within the second collaboration region.

10. The system of claim 8, wherein controlling the projector to project the first annotation comprises:
    detecting a movement of the second collaboration region;
    updating the second collaboration region based on the movement; and
    controlling the projector to project the first annotation onto the updated second collaboration region.

11. The system of claim 8, wherein creating the second annotation comprises identifying the one or more markings made by the second user, the identification comprising:
    processing an infrared image of the second collaboration region, the infrared image generated by the camera while the projector is projecting the first annotation onto the second collaboration region; and
    processing a color image of the second collaboration region, the color image generated by the camera while the projector is not projecting the first annotation onto the second collaboration region.

12. The system of claim 8, wherein the controller is further operable to:
    identify a third collaboration region on the first surface;
    create a third annotation corresponding to one or more markings made by the second user within the third collaboration region; and
    transmit the third annotation.

13. The system of claim 8, wherein creating the second annotation comprises:
    detecting a movement of the second collaboration region;
    updating the second collaboration region based on the movement; and
    identifying the one or more markings made by the second user within the updated second collaboration region.

14. A method, comprising:
    receiving, by a processor, a first annotation corresponding to one or more markings made by a first user within a first collaboration region of a first surface, the first surface remote from a second surface;
    identifying, by the processor, a second collaboration region on the second surface at least in part by detecting an edge within the image of the at least a portion of the first surface using at least one edge detection technique, the second surface proximate a camera, wherein the second collaboration region occupies less than the entirety of the second surface;
    displaying, by the processor, the first annotation in the second collaboration region;
    creating, by the processor, a second annotation corresponding to one or more markings made by a second user within the second collaboration region on the second surface; and
    transmitting, by the processor, the second annotation; and
    wherein identification of a second collaboration region further includes:
        searching for a closed path including the detected edge; and
        in response to determining that the closed path has not been previously designated as a collaboration region, designating a shape corresponding to the closed path as the second collaboration region.

15. The method of claim 14, wherein creating the second annotation comprises identifying the one or more markings made by the second user by processing a wavelength filtered image of the second collaboration region, the wavelength filtered image generated by the camera while the first annotation is displayed in the second collaboration region.

16. The method of claim 14, wherein creating the second annotation comprises identifying the one or more markings made by the second user by processing an image of the second collaboration region, the image generated by the camera while the first annotation is not displayed in the second collaboration region.

17. The method of claim 14, wherein creating the second annotation comprises:
   determining whether the second user is marking within the second collaboration region; and
   identifying the one or more markings made by the second user by processing an image of the second collaboration region, the image generated by the camera while the second user is not marking within the second collaboration region.

18. The system of claim 1, wherein the at least one edge detection technique comprises Canny edge detection.

19. The system of claim 1, wherein the first collaboration region is a piece of paper on the first surface and the edge is an edge of the piece of paper.

* * * * *